United States Patent
Kumar et al.

(10) Patent No.: US 7,414,963 B2
(45) Date of Patent: Aug. 19, 2008

(54) DYNAMIC ZERO SUFFIX ADDITION

(75) Inventors: Nishant Kumar, San Diego, CA (US); Dan Meacham, Del Mar, CA (US)

(73) Assignee: Staccato Communications, Inc., San Diego, CA (US)

( * ) Notice: Subject to any disclaimer, the term of this patent is extended or adjusted under 35 U.S.C. 154(b) by 523 days.

(21) Appl. No.: 11/099,340

(22) Filed: Apr. 4, 2005

(65) Prior Publication Data

US 2005/0219998 A1   Oct. 6, 2005

Related U.S. Application Data

(60) Provisional application No. 60/560,085, filed on Apr. 6, 2004.

(51) Int. Cl.
*H04J 11/00* (2006.01)

(52) U.S. Cl. .................... 370/206; 370/208

(58) Field of Classification Search .............. None
See application file for complete search history.

(56) References Cited

U.S. PATENT DOCUMENTS

| 6,842,487 | B1 * | 1/2005 | Larsson ............... 375/260 |
| 6,891,792 | B1 * | 5/2005 | Cimini et al. ......... 370/206 |
| 7,260,054 | B2 * | 8/2007 | Olszewski ............ 370/208 |
| 2004/0052206 | A1 * | 3/2004 | Cupo et al. ........... 370/206 |
| 2004/0066802 | A1 * | 4/2004 | Ro et al. .............. 370/528 |
| 2005/0030886 | A1 * | 2/2005 | Wu et al. ............. 370/206 |

* cited by examiner

*Primary Examiner*—Edan Orgad
*Assistant Examiner*—Jung Park
(74) *Attorney, Agent, or Firm*—Van Pelt, Yi & James LLP

(57) ABSTRACT

A method of processing a received OFDM symbol is disclosed. The received OFDM symbol has a symbol portion and a zero suffix portion. An information bearing portion of the zero suffix portion that is likely to contain information is determined and is combined with the symbol portion.

33 Claims, 8 Drawing Sheets

| Input | Output |
|---|---|
| 0-2 | 0 |
| 3-6 | 5 |
| 7-10 | 10 |
| 11-14 | 15 |
| 15-18 | 20 |
| 19-27 | 27 |
| >27 | 27 |

Figure 7

DYNAMIC ZERO SUFFIX ADDITION

CROSS REFERENCE TO OTHER APPLICATIONS

This application claims priority to U.S. Provisional Patent Application No. 60/560,085 entitled DYNAMIC ZERO SUFFIX ADDITION IN MB-OFDM SYSTEMS filed Apr. 6, 2004 which is incorporated herein by reference for all purposes.

BACKGROUND OF THE INVENTION

Orthogonal Frequency Division Multiplexing (OFDM) is a technique in which data is simultaneously transmitted over multiple sub-carriers separated (in frequency) by a multiple of the inverse of the symbol period. Due to the long symbol period, any frequency selective channel appears to be a flat channel which could be compensated by using a single frequency domain equalizer (FEQ) instead of using a complex time domain equalizer or multi-tap frequency domain equalizer. OFDM relies on the properties of the Inverse Fast Fourier Transform (IFFT)/Fast Fourier Transform (FFT) and orthogonality between the sub-carriers to achieve a 1 tap FEQ. Inter symbol interference (ISI) and Inter Carrier Interference (ICI) are two common factors which destroy orthogonality between the sub-carriers. Guard times (of durations equal to or greater than the maximum channel delay spread) are inserted between consecutive OFDM symbols to avoid ISI. The guard times may be in the form of some part of the end of the OFDM symbol which is added as a prefix to the OFDM symbol (commonly referred to as a cyclic prefix) or as zeros which are appended to the OFDM symbol (commonly referred to as a zero suffix). The length of the cyclic prefix or zero suffix is normally a fraction of the total OFDM symbol length. At the receiver, in a system employing a cyclic prefix, the prefix is discarded and the rest of the OFDM symbol is processed whereas in a system employing a zero suffix, the suffix samples are added to the beginning of the OFDM symbol in order to preserve the orthogonality between the sub-carriers. Suffix addition is a technique that may be employed in orthogonal frequency division multiplexing (OFDM) communication systems. Zero suffix addition has been suggested in connection with Multiband Orthogonal Frequency Division Multiplexing (MB-OFDM) systems. Using OFDM symbols, MB-OFDM systems implement Ultra Wideband (UWB) wireless communication under the regulations recently propagated by the Federal Communications Commission (FCC).

As stated above, separating transmitted OFDM symbols with a zero suffix helps to deal with potential multipath problems (such as ISI). At the receiver, a signal received during a zero suffix period may be added to a signal received during the preceding OFDM symbol period to simplify the demodulation implementation at the receiver (i.e., 1 tap FEQ). However, this addition process tends to add noise to the resulting summed signal that is further processed by the receiver. The zero suffix length is designed to accommodate the worst case multipath channel so that all the energy is captured and hence used in the demodulation of the signal. However, not all channels exhibit such strong multipath (e.g., AWGN channel which exhibits no multipath at all) and adding the entire zero suffix adds noise in the system with no added benefit. An improved method of processing received signals which are transmitted with a zero suffix would be useful.

BRIEF DESCRIPTION OF THE DRAWINGS

Various embodiments of the invention are disclosed in the following detailed description and the accompanying drawings.

FIG. 7 illustrates an embodiment of a LUT that maps the averaged output to the number of zero suffix samples to add.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method of processing a received signal is disclosed. The received signal contains a symbol portion and a suffix portion. An information bearing portion of the suffix portion that is likely to contain information is determined and combined with the symbol portion.

Figure 1:
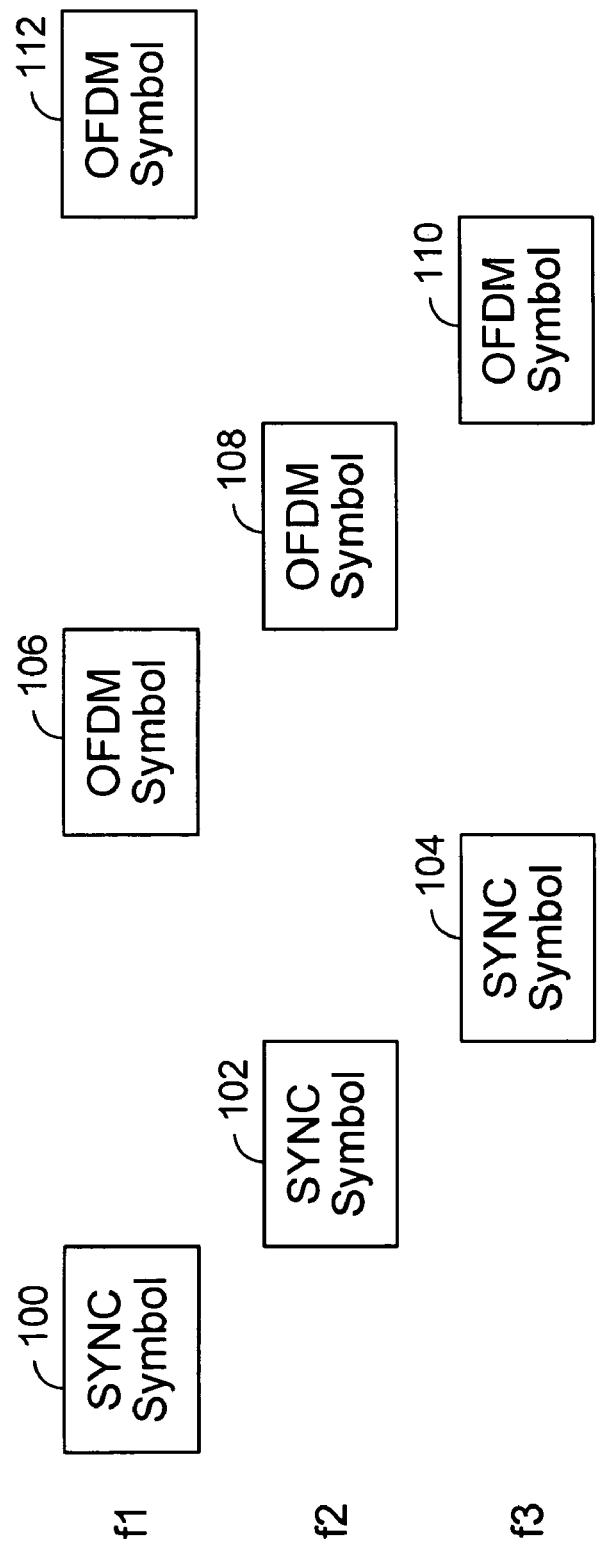
FIG. 1 illustrates an embodiment of a packet transmitted using frequency band hopping.

FIG. 1 illustrates an embodiment of a packet transmitted using frequency band hopping. In the example shown, there are three hop bands with center frequencies f1, f2 and f3. Some wireless systems, such as certain MB-OFDM systems, employ frequency hopping. Using frequency hopping, a packet is transmitted on multiple hop bands. In this example, the transmission band changes hop bands after each symbol. The illustrated packet comprises 7 symbols: synchronization symbols 100, 102, and 104 and data OFDM symbols 106, 108, 110, and 112. Synchronization symbol 100 is transmitted on hop band f1, synchronization symbol 102 is transmitted on hop band f2, and synchronization symbol 104 is transmitted on hop band f3. The sequence of hops for the data OFDM symbols follows the same pattern of f1, f2, and f3. Data OFDM symbol 106 is transmitted on hop band f1, data OFDM symbol 108 is transmitted on hop band f2, data OFDM symbol 110 is transmitted on hop band f3, and data OFDM symbol 112 is transmitted on hop band f1.

Synchronization symbols 100, 102 and 104 are used by the receiver to detect a packet. In the example shown, the synchronization symbols include a specific sequence of binary phase shift keying (BPSK) symbols known as the synchronization sequence. Since the synchronization sequence is known, it may be used to detect a packet. The receiver examines the received signal for synchronization symbols and detects a packet when synchronization symbols are detected.

A receiver may also use synchronization symbols 100, 102 and 104 to synchronize the receiver. Synchronization may include determining boundaries between symbols as well as determining the end of the synchronization symbols. Determining symbol boundaries may be performed iteratively over multiple synchronization symbols. For example, an initial boundary between synchronization symbol 100 and 102 is determined. The synchronization symbol duration is known. In some embodiments there are gaps or spaces between symbols (not shown). The receiver may take this into account and determine that the symbol boundary for synchronization symbol 102 begins at the initial boundary plus the synchronization symbol duration plus the gap duration. Since the symbol boundary is an expected value and the initial value may be inaccurate, the receiver may adjust the symbol boundary based on the actual reception of synchronization symbol 102. This adjustment may continue for all synchronization symbols.

Data OFDM symbols 106, 108, 110, 112 in general are either information bearing OFDM modulated symbols or are OFDM symbols which aid in the demodulation of data. They contain payload information which is transmitted from the transmitter to the receiver. In some embodiments, the receiver continues to adjust the symbol boundaries using the data OFDM symbols.

In some embodiments, the number of hop bands or the hop sequence varies from that illustrated. For example, rather than hopping after every symbol, multiple symbols are transmitted on the same hop band. Two or more successive symbols are transmitted on the same hop band and then the transmission band changes. In some embodiments, frequency band hopping is not employed. i.e., all of the symbols are transmitted on the same frequency band.

Figure 2A:
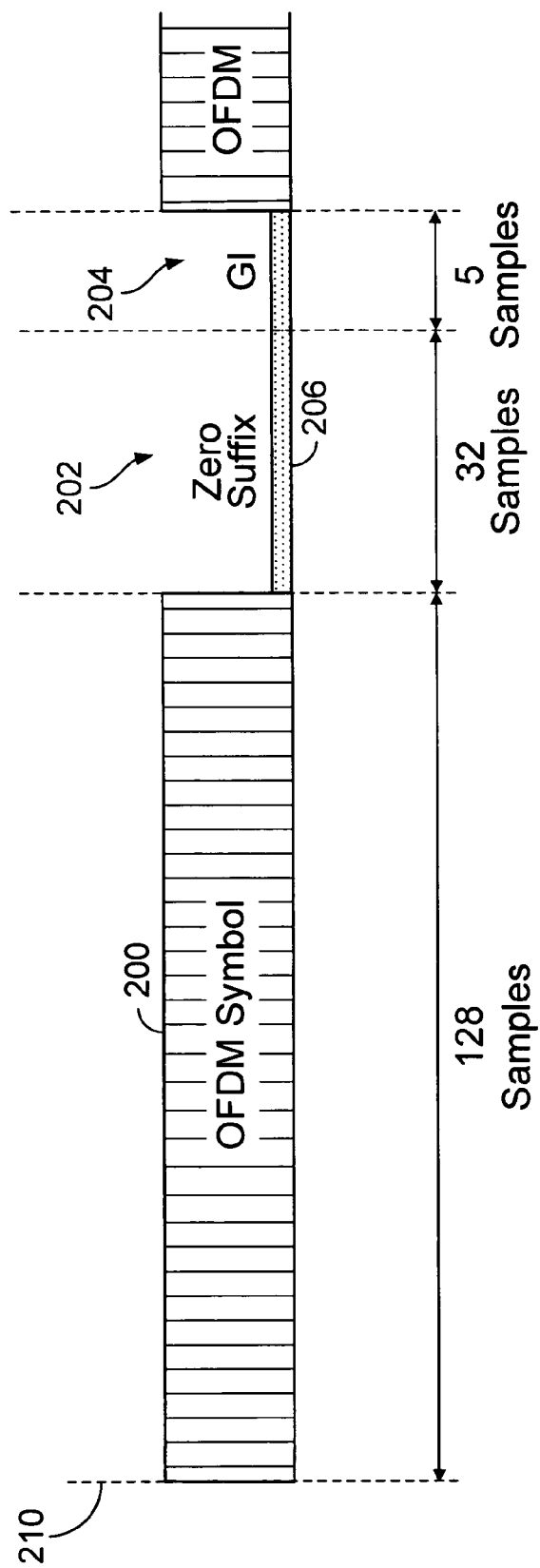
FIG. 2A illustrates an embodiment of a received transmission signal from a transmission environment that does not include multipath.

FIG. 2A illustrates an embodiment of a received transmission signal from a transmission environment that does not include multipath. In the example shown, the received transmission signal is received as an analog signal and is converted to digital samples. OFDM symbol samples 200 are the samples received during the OFDM symbol period. The OFDM symbol period begins at symbol boundary 210 and lasts for an OFDM symbol duration (equivalent to 128 samples). Symbol boundary 210 may be determined by a synchronization process. Zero suffix samples 202 are the samples received during the zero suffix period. The zero suffix period follows the OFDM symbol period and lasts for a zero suffix duration (equivalent to 32 samples). Guard interval (GI) samples 204 are the samples received during the guard interval period. The guard interval period follows the zero suffix period and last for a GI duration (equivalent to 5 samples). The zero suffix and the guard interval are transmitted as a gap between symbols; the transmitter will not transmit anything during the zero suffix and guard interval. There are 128 OFDM symbol samples 200, 32 zero suffix samples 202, and 5 GI samples 204.

The methods described are not limited to MB-OFDM systems and may be used with a variety of OFDM systems. For example, in some cases the OFDM symbol period may not correspond to 128 samples, the zero suffix period may not correspond to 32 samples, or the GI period may not correspond to 5 samples.

Zero suffix samples 202 and GI samples 204 contain noise 206. Noise 206 may be from a variety of sources in the transmission environment or components in the receiver. For example, other transmitters (besides the transmitter of interest that transmitted the OFDM symbol) may be transmitting in the vicinity of the receiver. This may contribute to noise 206. Components in the receiver may also introduce noise. For example, analog to digital converters (ADC) and amplifiers in the receiver may introduce noise 206 into the received signal.

Figure 2B:
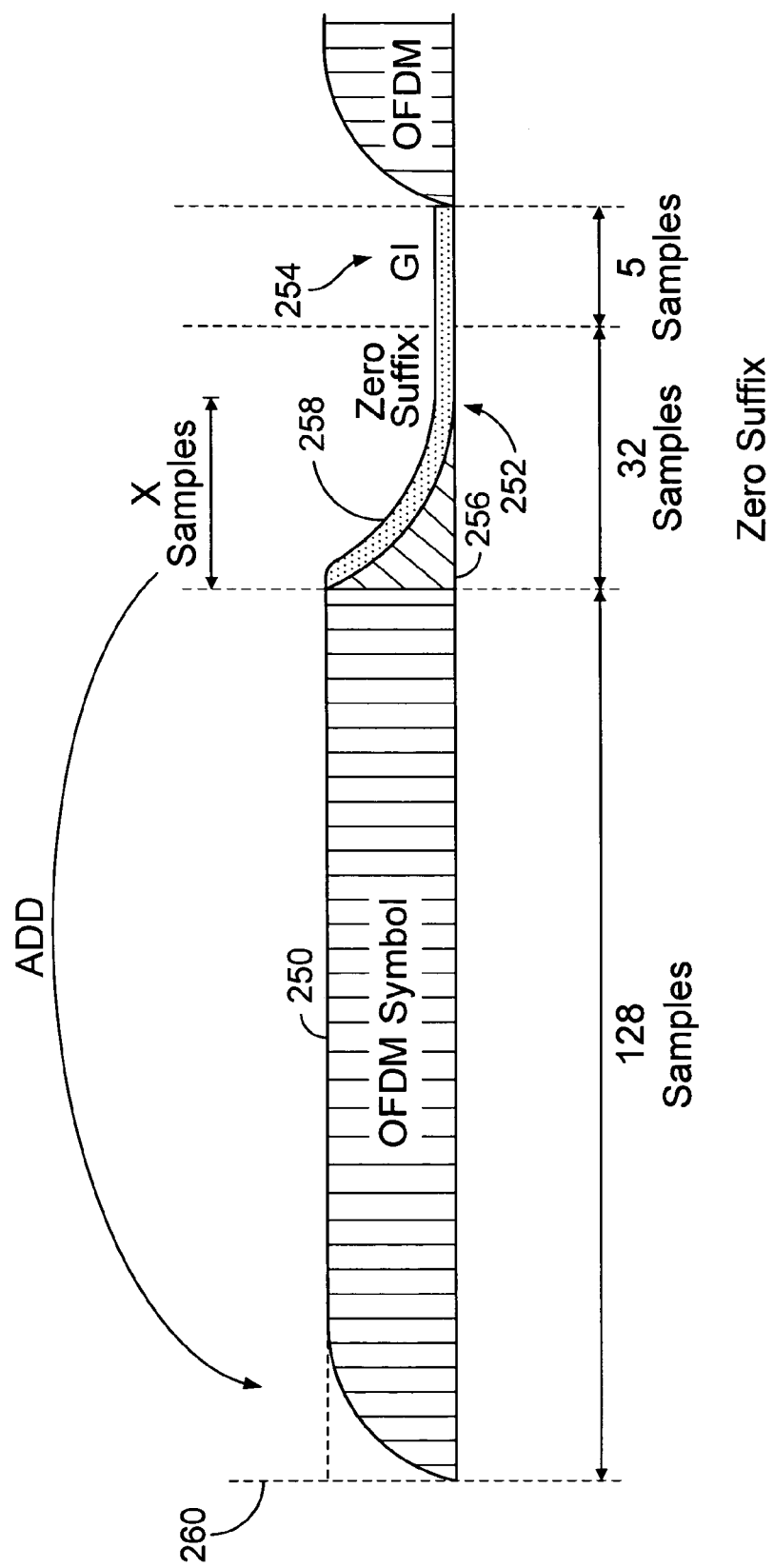
FIG. 2B illustrates an embodiment of a received transmission signal as modified by a transmission channel.

FIG. 2B illustrates an embodiment of a received transmission signal as modified by a transmission channel. In the example shown, the received transmission signal is affected by multipath. The received signal is a combination of reflected and direct signals that take different paths with propagation times from the transmitter to the receiver. The analog received signal is converted to digital samples. OFDM symbol samples 250 are the samples received during the OFDM symbol period, which begins at symbol boundary 260. OFDM samples 250 are also referred to as the symbol portion. Zero suffix samples 252 are the samples received during the zero suffix period, which follows the OFDM symbol period. Zero suffix samples 252 contain noise 258 and OFDM symbol information 256 from reflected signals. GI samples 254 are the samples received during the GI period. GI samples 254 contain noise 258. Zero suffix samples 252 and GI samples 254 are also collectively referred to as the suffix portion. There are 128 OFDM symbol samples 250, 32 zero suffix samples 252, and 5 GI samples 254.

As the result of multipath in the transmission environment, received zero suffix samples 252 contain OFDM symbol information 256. Some reflections of the transmitted OFDM symbol take longer to arrive at the receiver such that they arrive during the zero suffix period instead of the OFDM symbol period. The amount of time to receive all reflections of an OFDM symbol may therefore be greater than the OFDM symbol duration. In some transmission environments, the multipath is so severe that OFDM symbol information also extends into the GI period. GI samples would then contain OFDM symbol information in addition to noise. Samples in the suffix portion which contain OFDM symbol information are referred to as the information bearing portion.

In addition to extending OFDM symbol information outside of the OFDM symbol period, multipath may affect the orthogonality of subcarriers in received OFDM symbol samples 250. This is in contrast with OFDM symbol samples 200 in which orthogonality is maintained. To maintain orthogonality in a multipath environment, some of zero suffix samples 252 may be added to an initial portion of OFDM symbol samples 250. An information bearing portion of zero suffix samples 252 are added to an initial portion of OFDM symbol samples 250. In this example, the information bearing portion is the first X samples of zero suffix 252. Zero suffix addition is used to maintain the orthogonality of the frequency subcarriers for the received OFDM symbol. The resulting summed samples are processed by the receiver.

By adjusting the samples from the zero suffix samples that are added to the initial portion of the OFDM symbol samples, orthogonality may be maintained while limiting the introduction of noise. If there is relatively little multipath, then the delay spread of the channel is relatively small since most of the reflections arrive soon after the direct path signal. The number of zero suffix samples 252 with OFDM symbol information 256 is relatively small. If the zero suffix samples added are chosen so that samples likely to contain OFDM symbol information are added to the initial portion, the unnecessary addition of noise 258 may be avoided.

Various methods may be used to determine the number of zero suffix samples to add. In this example, the number of zero suffix samples to add is determined by analyzing how energy received from the transmission of synchronization symbols is spread out over time. The same portion of the zero suffix samples is added to an initial portion of each OFDM symbol contained in a packet. Synchronization symbols, like OFDM symbols, may be transmitted with a zero suffix and GI. Since synchronization symbols are transmitted in the same transmission environment as OFDM symbols, energy from the transmission of the synchronization symbol may extend into the zero suffix period. Assuming synchronization symbols are extended by multipath in a manner similar to OFDM symbols, the extension of synchronization symbol energy may be estimated to determine the zero suffix samples to add to OFDM symbol samples.

Figure 3:
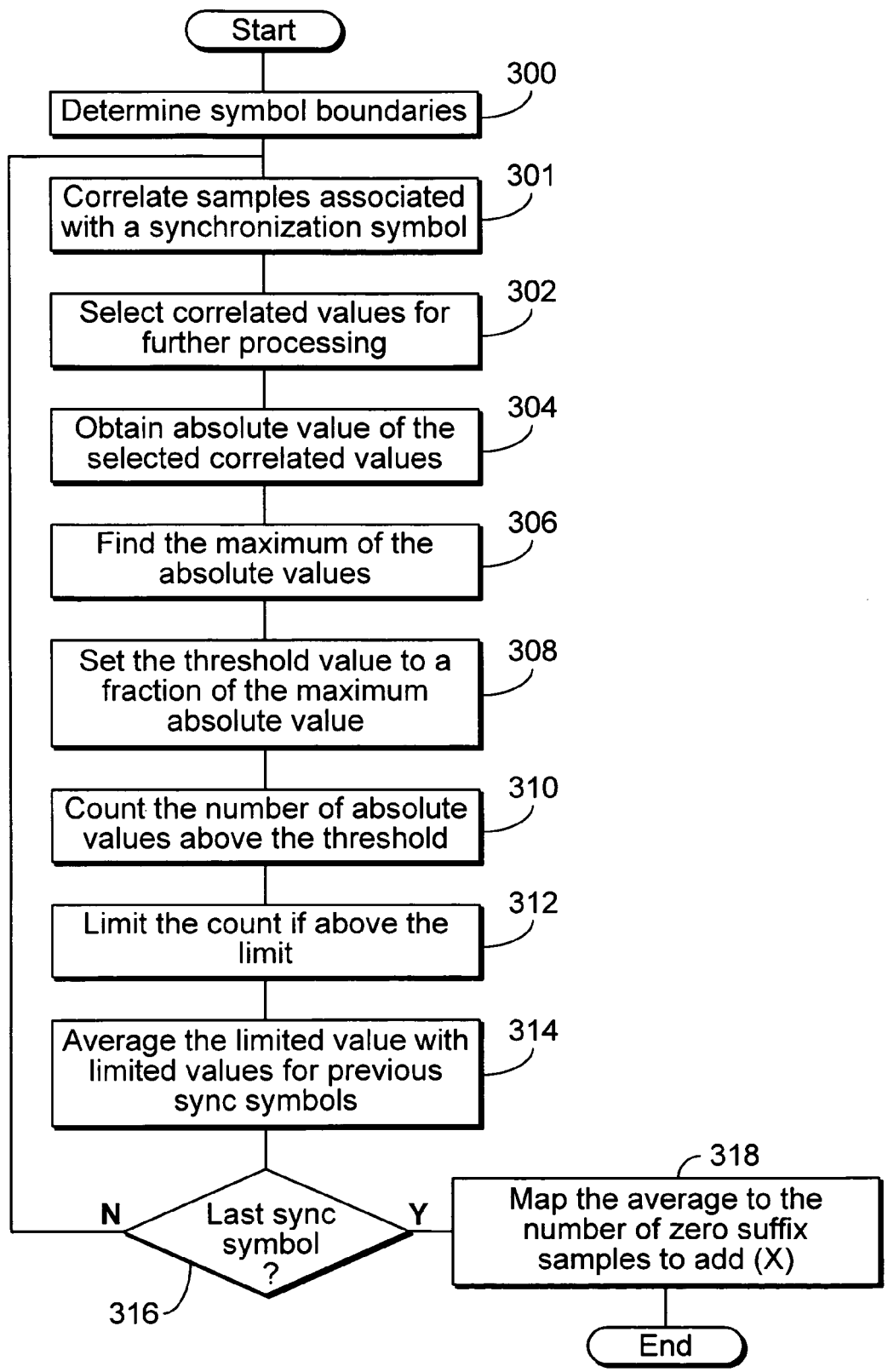
FIG. 3 is a flow chart illustrating an embodiment of a process for determining a number of zero suffix samples to add.

FIG. 3 is a flow chart illustrating an embodiment of a process for determining a number of zero suffix samples to add. Symbol boundaries are determined at 300. With symbol boundaries determined, the synchronization symbol period, zero suffix period, and GI period are known. Samples associated with a synchronization symbol are correlated 301. Samples associated with a synchronization symbol that may be used for correlation include the samples received in the synchronization symbol period (synchronization symbol samples), samples received in the zero suffix period (zero suffix samples), and samples received in the GI period (GI samples). In some embodiments, the received samples are cross-correlated with the known transmitted synchronization sequence. In some embodiments, the received transmission signal is auto-correlated with itself. In some embodiments, GI samples are removed before correlation. To reuse existing logic and save die size, a correlator used for acquisition and synchronization may be used.

Correlated values are selected for further processing 302. For example, there may be 165 correlated values per synchronization symbol and 60 samples are selected. Of the 165 correlated values indexed 0-164, samples at index 90-149 are selected for further processing. In some embodiments, all correlated values are used and selection step 302 is not performed.

Absolute values of the selected correlated values are obtained 304. For example, if the selected correlated values are complex values, then the magnitudes of the complex values are obtained. In some embodiments, the absolute value is an approximation or estimation.

The maximum of the absolute values is found 306. For example, if there are 60 absolute values, the largest of the 60 values is selected. The threshold value is set to a fraction of the maximum absolute value 308. For example, the threshold may be set to ¼ max(absolute values). $¼^{th}$ is convenient because it may be implemented easily using bit shifting. More generally, $2^{-i}$ where i is a positive integer is easily implemented. In some embodiments, the threshold is not a fraction of the maximum. For example, the threshold may be set to the median or mean value.

The number of absolute values above the threshold is counted 310 to obtain a count. For example, of 60 absolute values 40 may be above the threshold. The count is limited if it is above the limit 312. For example, if the count is 40 but there are only 32 zero suffix samples then the count is limited to 32. In some embodiments, the limit includes the number of GI samples. For example, if there are 32 zero suffix samples and 5 GI samples then the limit is 37. In some embodiments, limiting is not performed.

The limited value is averaged with limited values for previous synchronization symbols 314. In some embodiments, an Infinite Impulse Response (IIR) filter is used. The initial state of the IIR filter is zero and the limited value for the synchronization symbol is fed to the IIR filter. The output is stored for the next synchronization symbol, if any. In some embodiments, averaging is not performed. In some embodiments, band hopping is used to transmit the signals and there is an average for each hop band.

At 316, it is determined whether the synchronization symbol being processed is the last synchronization symbol. If it is not the last synchronization symbol, samples associated with the next synchronization symbol are correlated 301. If it is the last synchronization symbol, the average from step 314 is mapped to the number of zero suffix samples to add (X) 318. For example, the mapping may be a step function. In some embodiments, the mapping process is not performed.

In some embodiments, frequency hopping is employed and different averages are stored for each frequency hop band. For example, if the hop bands are f1, f2, and f3, an average is stored for each hop band. The average for f1 is an average for the synchronization symbols transmitted on hop band f1. Similarly, synchronization symbols transmitted on hop band f2 determine the f2 average and the synchronization symbols transmitted on hop band f3 determine the f3 average. A different number of zero suffix samples to add may thus be determined for each band. In some embodiments, a composite number of zero suffix samples to add is determined from the synchronization symbols transmitted over different bands. The composite number of zero suffix samples to add may be determined by averaging the results for each band or by other methods. For example, a weighted average (where the weights are proportional to the signal strengths of the received synchronization symbol) or the median value may be used.

Although the illustrated examples may describe methods in the context of an MB-OFDM system, the methods are not limited to MB-OFDM systems. MB-OFDM systems are used for illustrative purposes and not meant to be limiting. In some embodiments, the methods described are employed by a wireless system other than MB-OFDM. In some embodiments, the transmission environment is wired. Examples of such wired communication systems include, but are not limited to, Ethernet networks, DSL systems, cable modem systems, modem communications via telephone lines, etc.

In some embodiments, the steps described are implemented in parallel or in a different order. For example, selection of the correlated values for further processing 302 may be performed while correlation 301 is still being performed. In some embodiments, multiple synchronization symbols are processed at the same time.

Determining the set of zero suffix samples to add may be performed at a variety of times and used for various durations. The set of zero suffix samples to add may be determined once per packet. Alternatively, the number of zero suffix samples to add may be determined once in the lifetime of a device's association with a network. For example, when a wireless device joins a network, as part of the initialization process the wireless device determines the set of zero suffix samples to add. This set is used so long as the wireless device is associated with a network. In some cases the number of zero suffix samples to add is determined multiple times per packet. In general, the number of zero suffix samples to add may be determined on a periodic basis or on an event driven basis.

In some embodiments, other methods in addition to or in place of those described are used to determine the samples to add. In some embodiments, OFDM symbols are used to determine the samples to add. In some embodiments, signal strengths of received zero suffix samples are measured to determine the samples to add without performing a correlation.

Figure 4:
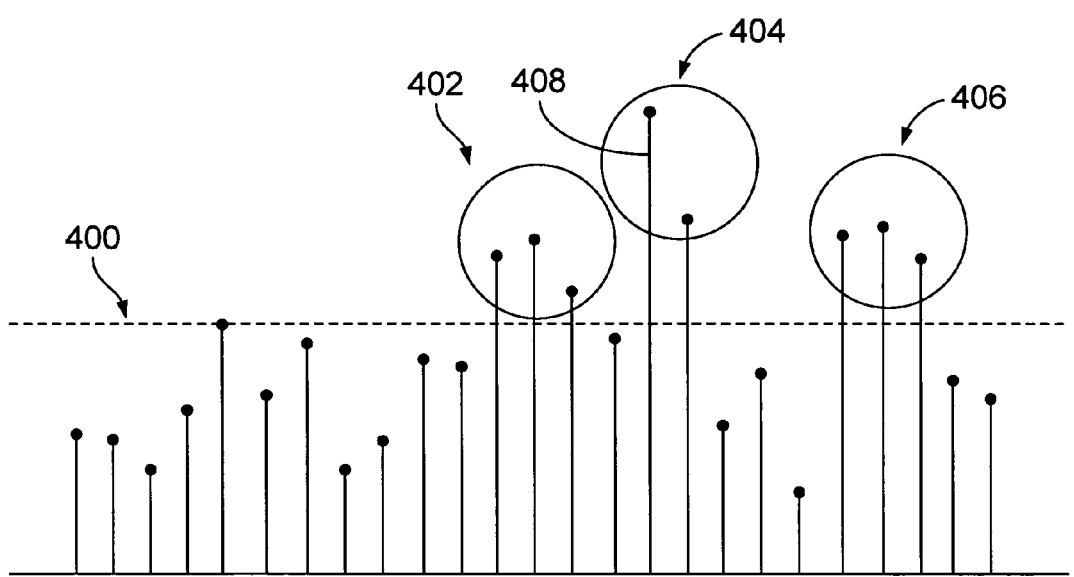
FIG. 4 illustrates an example of absolute values of correlated samples of a synchronization symbol.

FIG. 4 illustrates an example of absolute values of correlated samples of a synchronization symbol. Some of the absolute values are greater than threshold 400. Three groups of absolute values 402, 404, and 406 are greater than threshold 400. In some embodiments, the threshold is a fraction of the maximum absolute value, for example, ½ of absolute value 408.

Counting is not the only method of determining zero suffix samples to add using absolute values of correlated samples. Other analysis methods may be employed. In some embodiments, groups or clusters of absolute values derived from synchronization symbols are analyzed. Groups of absolute values 402, 404, and 406 are examples of such groups. The number of absolute values above a threshold may be considered. The indices at which groups 402, 404, and/or 406 occur may be considered. Ratios may be analyzed. The values used for the ratios may be associated with the same group or different groups. Ratios may also compare the time/index at which a group occurs or a representative absolute value of the group. Some other methods for determining a set of zero suffix samples to add include: profiling derived samples (such as the absolute values of correlated values) based on when they occur and how densely they occur, counting the number of consecutive derived samples exceeding a threshold, a combination of counting the number of derived samples and clustering of derived samples, examining the relative energy between clusters, the time dispersion of derived samples, and a combination of any of the above. The tradeoff between noise and OFDM symbol information may be considered. For example, the amount of OFDM symbol information and noise for a candidate zero suffix sample may be estimated. A decision of whether or not to use the candidate zero suffix sample is made using the estimated values.

In some embodiments, the samples added to the OFDM symbol samples are not consecutive or contiguous. For example, groups 402, 404 and 406 may indicate the presence of three multipath components. Two multipath components introduce smaller delay spreads and the third multipath component introduces a larger delay spread. In the zero suffix samples, this may correspond to zero suffix samples with OFDM symbol information that are not consecutive samples. For example, of the 32 zero suffix samples indexed from 0-31, the zero suffix samples at 0-5 and 9-11 contain OFDM symbol information. Adding all zero suffix samples at indices 0-11 would add some samples with noise but no OFDM symbol information (e.g., the zero suffix samples at indices 6-8). The information bearing samples of the suffix portion added may be described by a set, and in some cases the set contains non-consecutive samples.

A variety of analytical methods may be applied to the absolute values of correlated values. The analysis may examine the absolute values with respect to a threshold, including absolute values below a threshold. The number of absolute values below a threshold may be counted; the count may be subtracted from another number in determining the number of zero suffix samples to add. Conversely, some embodiments do not analyze the absolute values with respect to a reference value such as a threshold.

Figure 5:
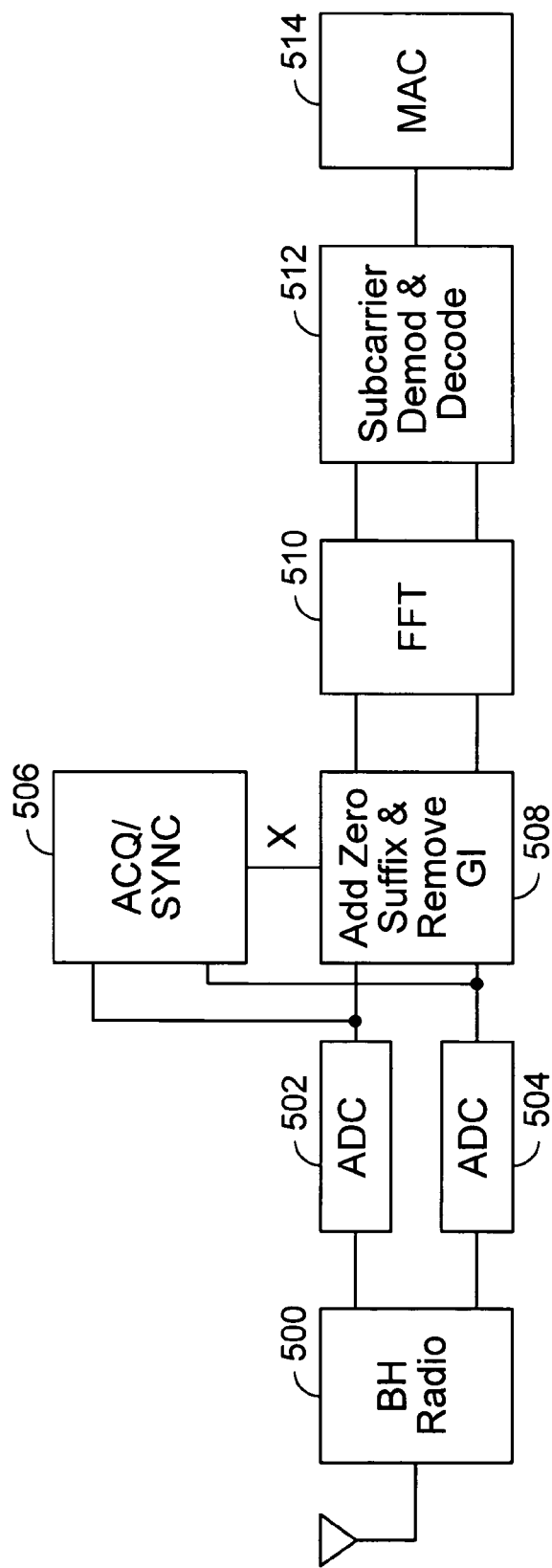
FIG. 5 is a block diagram illustrating an embodiment of a receiver.

FIG. 5 is a block diagram illustrating an embodiment of a receiver. In the example shown, the receiver performs zero suffix addition. Some elements which are not directly related to zero suffix addition are not illustrated. Band hopping (BH) radio 500 is coupled to ADCs 502 and 504. The signal from BH radio 500 is complex valued. ADC 502 converts the real valued portion and ADC 504 converts the imaginary valued portion. In some embodiments, the output from BH radio 500 is completely real/imaginary valued and there is only one ADC. Acquisition and synchronization block 506 is coupled to ADCs 502 and 504. Acquisition and synchronization block 506 performs acquisition and synchronization on the digital outputs of ADCs 502 and 504. Acquisition and synchronization block 506 also determines X, the number of zero suffix samples to add, using some or all of the synchronization symbols.

X is passed from acquisition and synchronization block 506 to add zero suffix and remove GI block 508. Add zero suffix and remove GI block 508 operates on OFDM symbols. In some embodiments, selected GI samples are added to the OFDM symbol samples in addition to selected zero suffix samples. The resulting summed OFDM symbol is passed to Fast Fourier Transform (FFT) 510. FFT 510 takes the complex valued output from add zero suffix and remove GI block 508 and converts it from time domain to frequency domain. FFT 510 operates on a symbol by symbol basis. The frequency domain output from FFT 510 is passed to subcarrier demodulation and decoding block 512 for demodulation and decoding. From subcarrier demodulation and decoding block 512, the decoded output is passed to Medium Access Controller (MAC) 514.

Figure 6:
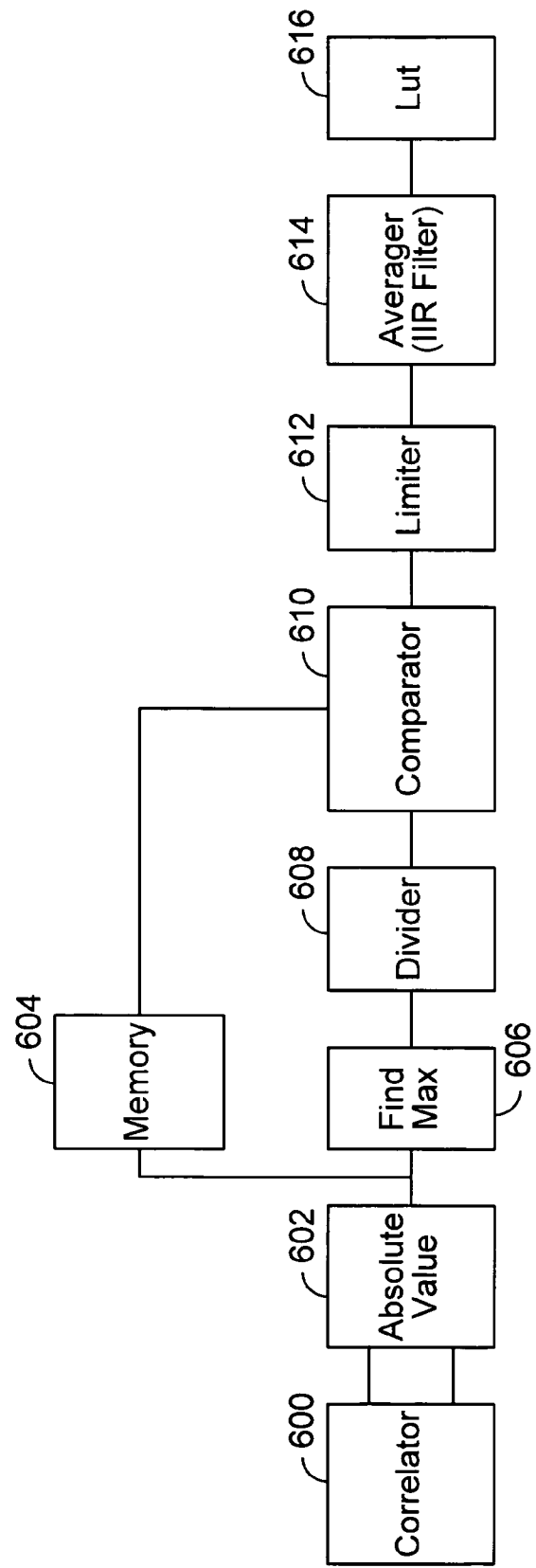
FIG. 6 illustrates a block diagram of a device that determines a number of zero suffix samples to add.

FIG. 6 illustrates a block diagram of a device that determines a number of zero suffix samples to add. The elements of the block diagram may be incorporated within an acquisition and synchronization block, such as that illustrated in the previous figure. In the example shown, correlator 600 correlates samples associated with a synchronization symbol on a symbol by symbol basis. Some of the samples correlated may be received in the zero suffix period. In some embodiments, the samples are converted to digital format before correlation. Absolute value block 602 is coupled to correlator 600 and receives the complex correlated outputs. In some embodiments, absolute value block 602 performs an approximation of the absolute value. The absolute values are passed to memory 604 and find max block 606.

Divider 608 is coupled to find max block 606. Divider 608 divides the maximum absolute value found by find max block 606. For example, divider 608 may divide the maximum absolute value by 4. The divided value is passed to comparator 610 as the threshold. Using the threshold value from divider 608, comparator 610 counts the number of stored absolute values above the threshold. The stored absolute values are stored in memory 604. For example, memory 604 stores the absolute values at indices 90-149 and these stored values are passed to comparator 610. The count is passed from comparator 610 to limiter 612.

Limiter 612 limits the count if it is above the limit. The limited value is passed to averager 614. In some embodiments, averager 614 is implemented as an IIR filter. The limited value is averaged by averager 614 with the limited values for other synchronization symbols. In some embodiments, a different function, such as the median or a weighted average, is used to combine the limited values. In some embodiments, averaging is not performed until all of the synchronization symbols are processed. The output from averager 614 is passed to look up table (LUT) 616. LUT 616 performs a mapping of the averaged output to X, the number of zero suffix samples to add. X is passed to another block that performs the addition of the appropriate zero suffix samples and OFDM symbol samples.

FIG. 7 illustrates an embodiment of a LUT that maps the averaged output to the number of zero suffix samples to add. In the example shown, the averaged value (input) may come from an IIR filter after all synchronization symbols are processed. The number of zero suffix samples to add, X (the output), may be passed to a block that performs the addition. LUT 700 performs a step function mapping. If the average is in the range of 0-2, 0 zero suffix samples are added. An average of 3-6 corresponds to 5 zero suffix samples to be added, 7-10 corresponds to 10 zero suffix samples to be added, 11-14 corresponds to 15 zero suffix samples to be added, 15-18 corresponds to 20 zero suffix samples to be added, 19-27 corresponds to 27 zero suffix samples to be added, and more than 27 corresponds to 27 zero suffix samples to be added. The contents of LUT 700 are illustrative and may vary from that described. In some embodiments, the mapping is implemented using something else besides a LUT. In some embodiments, the mapping function is not performed and LUT 700 is not implemented.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. The method of processing a received signal including:
   receiving the signal having a symbol portion and a suffix portion;
   determining an information bearing portion of the suffix portion that is likely to contain information by:
   correlating a preamble portion of the received signal to obtain a plurality of correlated values;
   obtaining a plurality of absolute values of the correlated values;
   comparing the absolute values to a threshold; and
   determining a number of samples of the information bearing portion of the suffix portion based at least in part on the comparison; and
   combining the information bearing portion of the suffix portion having the determined number of samples with the symbol portion.

2. The method as recited in claim 1, wherein the received signal includes an OFDM signal.

3. The method as recited in claim 1, wherein the suffix portion includes a zero suffix portion.

4. The method as recited in claim 1, wherein an initial portion of the symbol portion is combined with the information bearing portion of the suffix portion.

5. The method as recited in claim 1, wherein the received signal is received via a wireless environment.

6. The method as recited in claim 1, wherein combining the information bearing portion of the suffix portion with the symbol portion includes addition.

7. The method as recited in claim 1, wherein the suffix portion is after the symbol portion.

8. The method as recited in claim 1, wherein the symbol portion corresponds to an OFDM symbol duration.

9. The method as recited in claim 1, wherein the suffix portion contains information due at least in part to multipath.

10. The method as recited in claim 1, wherein the information bearing portion of the suffix portion comprises a set of samples.

11. The method as recited in claim 1, wherein the information bearing portion of the suffix portion is not contiguous within the suffix portion.

12. The method as recited in claim 1, wherein the number of samples of the information bearing portion is proportional to a delay spread of a preamble symbol of the received signal.

13. The method as recited in claim 1, wherein determining the information bearing portion includes estimating amounts of noise and information contained by a candidate information bearing portion of the suffix portion.

14. The method as recited in claim 1, wherein determining the information bearing portion of the suffix portion includes determining an amount of time to receive a preamble symbol.

15. The method as recited in claim 1, wherein the absolute values are estimated.

16. The method as recited in claim 1, wherein comparing includes counting the number of absolute values above the threshold to obtain a count.

17. The method as recited in claim 1, wherein the threshold is a fraction of max(absolute values).

18. The method as recited in claim 16, wherein determining the information bearing portion further includes:
   combining the count for the preamble portion with another preamble portion's count.

19. The method as recited in claim 1, wherein determining the information bearing portion includes using a look up table to obtain a number of samples to combine with the symbol portion.

20. The method as recited in claim 1, wherein the received signal is received from a plurality of bands and an information bearing portion of the suffix portion is determined for each of the plurality of bands.

21. The method as recited in claim 1, wherein determining the information bearing portion includes analyzing a value associated with a group of samples derived from the received signal.

22. The method as recited in claim 1, wherein determining the information bearing portion includes analyzing an index at which a group of samples derived from the received signal occurs.

23. The method as recited in claim 1, wherein determining the information bearing portion includes:
   determining a first group of samples derived from the received signal;
   determining a second group of samples derived from the received signal; and
   analyzing a first value associated with the first group in the context of a second value associated with the second group.

24. A system for processing a received signal including:
   a receiver configured to receive the signal having a symbol portion and a suffix portion;
   a signal analyzer configured to determine an information bearing portion of the suffix portion that is likely to contain information, by:
   correlating a preamble portion of the received signal to obtain a plurality of correlated values;
   obtaining a plurality of absolute values of the correlated values;
   comparing the absolute values to a threshold; and
   determining a number of samples of the information bearing portion of the suffix portion based at least in part on the comparison; and a combiner configured to combine the information bearing portion of the suffix portion having the determined number of samples with the symbol portion.

25. The system as recited in claim 24, wherein the suffix portion is after the symbol portion.

26. The system as recited in claim 24, wherein the information bearing portion of the suffix portion comprises a set of samples.

27. The system as recited in claim 24, wherein the number of samples of the information bearing portion is proportional to a delay spread of a preamble symbol of the received signal.

28. The system as recited in claim 24, wherein determining the information bearing portion of the suffix portion includes determining an amount of time to receive a preamble symbol.

29. A computer readable medium encoded with computer executable instructions for:
   receiving the signal having a symbol portion and a suffix portion;
   determining an information bearing portion of the suffix portion that is likely to contain information, by:
      correlating a preamble portion of the received signal to obtain a plurality of correlated values;
      obtaining a plurality of absolute values of the correlated values;
      comparing the absolute values to a threshold; and
      determining a number of samples of the information bearing portion of the suffix portion based at least in part on the comparison; and
   combining the information bearing portion of the suffix portion having the determined number of samples with the symbol portion.

30. The computer executable instructions as recited in claim 29, wherein the suffix portion is after the symbol portion.

31. The computer executable instructions as recited in claim 29, wherein the information bearing portion of the suffix portion comprises a set of samples.

32. The computer executable instructions as recited in claim 29, wherein the number of samples of the information bearing portion is proportional to a delay spread of a preamble symbol of the received signal.

33. The computer executable instructions as recited in claim 29, wherein determining the information bearing portion of the suffix portion includes determining an amount of time to receive a preamble symbol.

* * * * *